UNITED STATES PATENT OFFICE.

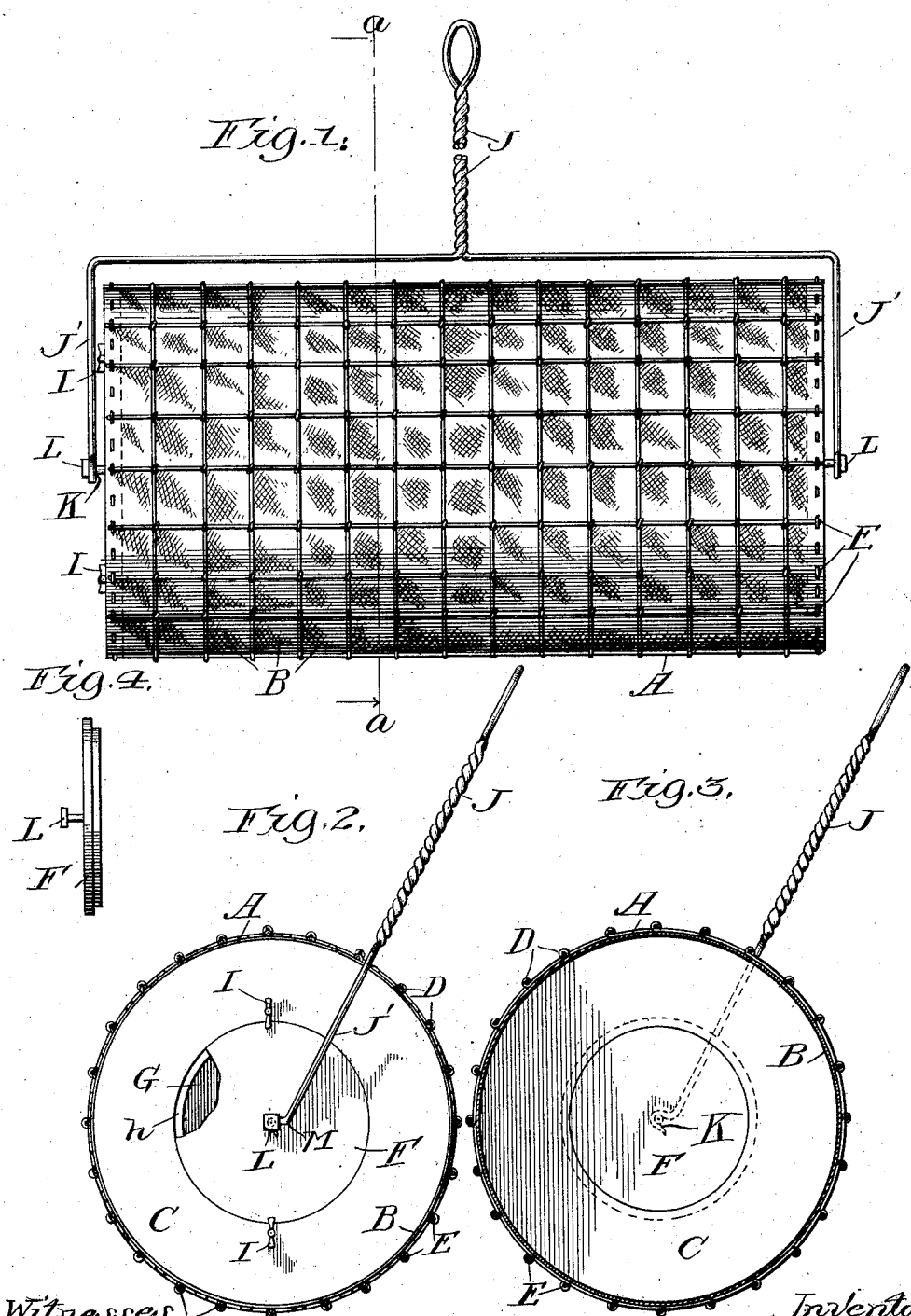

CYRUS H. LEE, OF SILVER CREEK, NEBRASKA.

LICE-KILLING MACHINE.

No. 851,098.  Specification of Letters Patent.  Patented April 23, 1907.

Application filed December 21, 1906. Serial No. 348,843.

*To all whom it may concern:*

Be it known that I, CYRUS H. LEE, a citizen of the United States, residing at Silver Creek, in the county of Merrick and State of Nebraska, have invented certain new and useful Improvements in Lice-Killing Machines, of which the following is a specification.

This invention relates to mechanical devices for applying lice-killing dust or powder to poultry by inclosing the chicks or fowls, with a quantity of the powder, within a rotatable cylinder which, being turned, causes the powder quickly to come into contact with every feather and kills all the lice at one operation.

In the only other lice-killing machine of which I have knowledge, the inclosure in which the fowls are dusted is provided with a single opening which is so located that the fowls would have to be removed by hand, one at a time, which, is objectionable, because of its inconvenience.

The general object of my invention is to improve the efficiency and the construction of such machines, and one of my special objects is to provide a machine of the kind which may be very quickly opened up, thereby letting the poultry escape quickly from the dusting chamber without being handled.

Other objects and advantages will hereinafter appear.

My invention consists in the novel construction, a preferred example of which is herein described, and illustrated in the accompanying drawings, wherein—

Figure 1 is a front elevation of a lice-killing machine embodying my invention, the bail handle being broken out; Fig. 2 is an end elevation thereof showing the door in position; Fig. 3 is a vertical section on line $a$–$a$ of Fig. 1; Fig. 4 is an edge view of one of the doors.

A, designates the cylindrical receptacle or inclosure which is made sufficiently large to hold a number of full-grown fowls. It consists of a rigid framework, provided with a tubular cloth or convas lining, B, which extends from end to end of the receptacle. Said framework comprises two circular wooden heads, C, and, preferably, a cylinder of large mesh woven wire, D, which holds the heads C in rigid relation. Before the wire is attached, however, the ends of the canvas tube B are stapled or otherwise secured to the heads C; then the longitudinal wires D are fastened to the heads, with staples E.

The foraminated or interstitial cylinder prevents spreading of the cloth lining, but leaves the latter exposed to atmosphere so that the poultry will be supplied with fresh air while within the machine.

My object being to introduce and remove the poultry through the end or ends of the receptacle, and not through the side thereof, I provide one, or both, of the heads C with a bodily removable door, F, which is preferably shouldered, as shown, and fitted in the opening G which may also be shouldered, as shown at $h$. When closed the door is held in position by turnbuttons I or by any preferred device.

Instead of turning the cylinder by means of a crank, I prefer to turn it by rolling it upon a supporting surface. To this end I provide a suitable handle bail, J J', made of galvanized iron wire, its handle or shank J being formed by twisting the wires together. The bail proper J' is provided at its ends with open slotted bearings, K, which construction permits the bail to be quickly and easily removed from the headed gudgeons L of the cylinder. Each bearing K is made with a shoulder M, which prevents accidental disengagement of the bail from the gudgeons or screws L.

The operation is as follows: The door F is removed and a suitable quantity of lice-killing dust or powder is thrown into the receptacle. The chicks or fowls are placed therein, the door is closed, and the cylinder is rolled slowly along the ground or other surface by means of the bail handle J. The powder is thereby diffused through the air within the receptacle and permeates the feathers. For a lot of small chicks, three revolutions are sufficient, and for full-grown fowls, five revolutions. At once the operator detaches the bail and removes the door or doors, whereupon the chickens quickly escape, without being handled.

Various modifications of this machine fall within the scope of my invention.

I claim as my invention:

1. A lice killing machine comprising a cylindrical receptacle having a fabric lining and a foraminated covering, a suitable door in one end of the receptacle, and a handle attached to said receptacle.

2. A lice killing machine comprising a cylindrical receptacle having heads, a cloth lining and an interstitial protecting covering, said heads being provided with gudgeons a suitable door in one of said heads, and a bail for rolling the receptacle upon a supporting surface.

3. A lice killing machine comprising a cylindrical receptacle having heads, one of which is provided with a door, a gudgeon upon said door, concentric with the head, a gudgeon upon the opposite head, and a detachable bail for rolling the receptacle upon a supporting surface.

4. A lice killing machine comprising a cylindrical receptacle composed of two heads, a woven wire cylinder and a cloth lining, a door in one of said heads, gudgeons on the ends of said receptacle, and a handled bail for rolling the receptacle upon a supporting surface.

5. A lice killing machine comprising a tumbling-cylinder provided with a closable end opening and a cover, in combination with headed gudgeons on the ends of said cylinder and a bail for rolling the cylinder upon a supporting surface, the ends of the bail being provided with open slots engaging said gudgeons.

CYRUS H. LEE.

Witnesses:
NEWTON L. SQUIRE,
P. H. BELL.